Nov. 30, 1937.   H. A. STILSON   2,100,363
ANIMAL TRAP
Filed Aug. 13, 1934
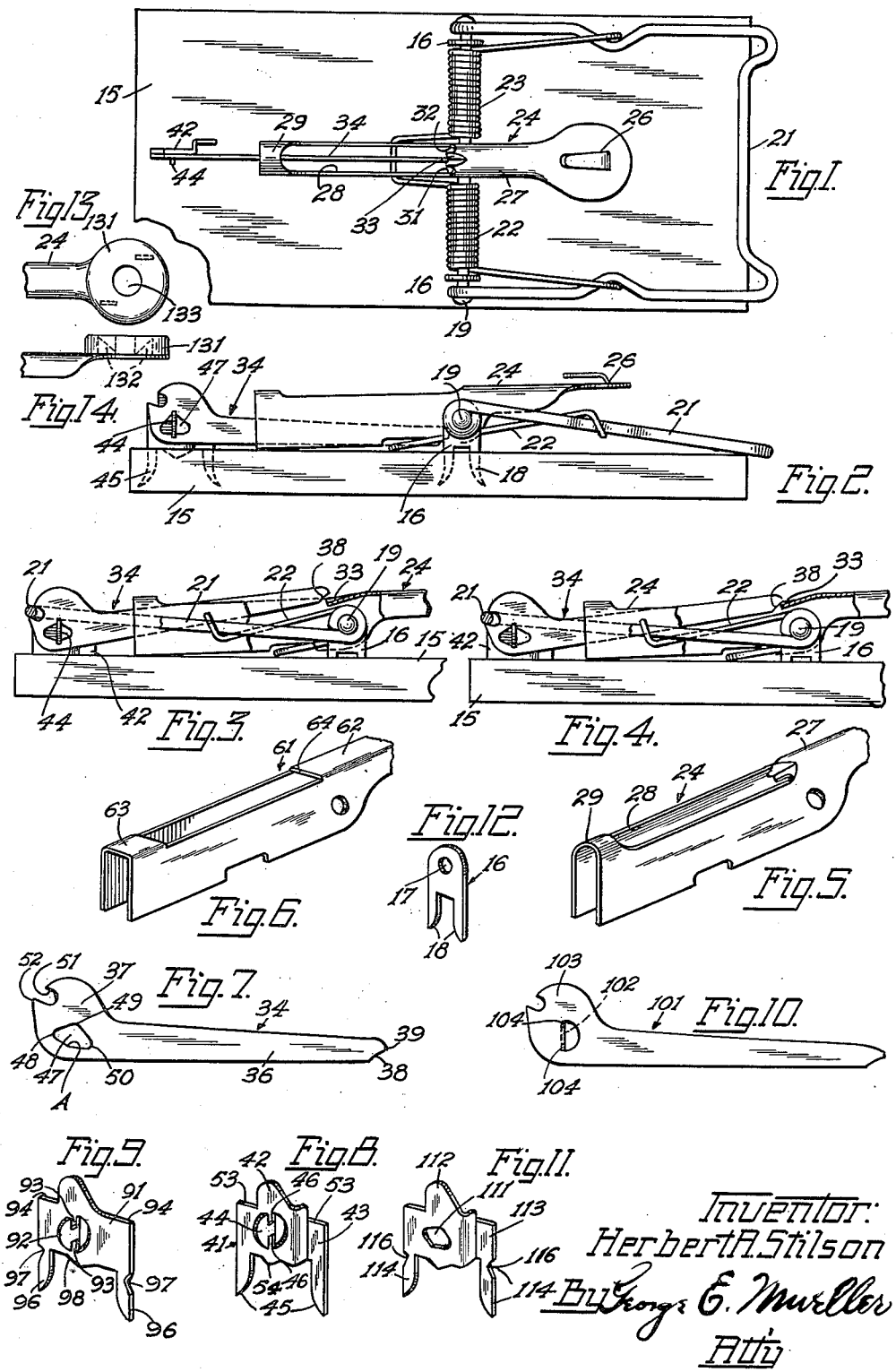

Patented Nov. 30, 1937

2,100,363

UNITED STATES PATENT OFFICE 2,100,363

ANIMAL TRAP

Herbert A. Stilson, Chicago, Ill.

Application August 13, 1934, Serial No. 739,541

12 Claims. (Cl. 43—83)

My invention relates in general to animal traps, and more in particular to the type generally employed for trapping mice and rats.

It is necessary in a mouse or rat trap to provide a device which is very sensitive so as to be released with a slight pressure, yet one which is sturdy enough to withstand rather vigorous onslaughts and slashings at times. Inasmuch as a trap of this character is ordinarily used but once, the cost of the device is a very important consideration in the commercial success of the same.

It is an object of my invention to provide an improved mouse and rat trap.

It is also an object to provide a device having a very sensitive jaw release trigger for rapid action of the trap.

A further object is to provide a trap in which the jaw may be easily set in operative position; and A still further object is to provide a sturdy trap, inexpensive, which is low in cost both from the standpoint of materials and labor.

Other objects and advantages of my invention will be apparent from the following detailed description taken with the drawing in which:

Fig. 1 is a top plan view of the trap of my invention in normal inoperative position.

Fig. 2 is a side elevation of the same.

Fig. 3 is a fragmentary side elevation of the trap, illustrating the jaw and trigger lever in position during the process of setting the trap.

Fig. 4 is a similar view with the jaw set and locked in position by the trigger lever.

Fig. 5 is a fragmentary perspective view of the treadle of Figs. 1 to 4.

Fig. 6 is a fragmentary perspective view of a modification of the treadle.

Fig. 7 is a side elevation of the trigger lever of Figs. 1 to 4.

Fig. 8 is a perspective view of the trigger support and pivot.

Fig. 9 is a perspective view of a modification of the structure of Fig. 8.

Figs. 10 and 11 are perspective views of modifications of the pivot and trigger members with the support and pivot structure reversed from that of Figs. 7 and 8.

Fig. 12 is a perspective view of the bearing staple.

Fig. 13 is a fragmentary top plan view of a modification of the bait holding portion of the treadle.

Fig. 14 is a side elevation of the same.

In practicing my invention I provide a spring actuated mouse trap in which the jaw locking and releasing mechanism is made up of stamped metal parts including a trigger lever and lever support, with the lever support carried on the trap base and standing parallel to the trigger lever to pivotally engage said lever on one side thereof.

Referring now to the drawing, a trap is illustrated in Fig. 1 with the usual wooden base 15. A pair of bearing staples 16 (Fig. 12) apertured at 17 are driven into the base approximately midway from each end and secured therein by legs 18 which are bowed over the inside surface, and which legs, by virtue of this configuration, bend to the shape shown in dotted lines in Fig. 2 as they are driven into the wood.

The bearing staples carry a pin 19 which in turn supports the usual bent wire jaw 21 and coil springs 22 and 23 adapted to bear against the jaw 21 with the desired pressure.

Intermediate the coil springs 22 and 23, a bait treadle 24 is pivotally carried on the pin 19. The treadle is stamped from a single piece of sheet metal and comprises a bait carrying portion 26 at one end extending into a U-shaped body portion 27 with an elongated slot 28 along the top thereof, terminating in a bridge 29 at the rear thereof. The front end of the slot 28 terminates in a pair of slits 31 and 32 on each side of a depressed seat 33 substantially V-shaped at the front portion and tapering up to the body portion of the treadle. The depressed seat 33 is provided simply that its inclined walls may act as guides for the movable trigger 34 as it is tipped upwardly as will be hereinafter described.

When the trap is in inoperative position, as shown in Fig. 2, the treadle 24 normally lies with the rear end resting on the base 15 and covering the trigger lever 34 which at the same time rests with its front end on the base. The trigger lever 34 cooperating with the treadle member 24 to set the jaw in operative position comprises a single piece stamped metal part with an elongated shank 36 having an irregularly shaped front end, and an enlarged head 37 at the opposite or rear end. The irregularly-shaped front end is curved at its lower edge 38 in a line corresponding to the arc of a circle with the pin 19 as a center, drawn when the trigger 34 is in the position shown in Fig. 4. The upper portion 39 of the point extends to the rear at an angle so as to slide on the under surface of the treadle as the trigger is tipped upwardly.

To facilitate setting the mouse trap and then insure a sensitive release action therein, it is important that there be a minimum of sidewise play in the treadle and trigger assembly. Satisfactory action is assured in a simple, inexpensive trigger support and pivot 41 (Fig. 8). This includes a vertically extending body portion 42 and an offset integral portion 43 lying in a parallel vertical plane, with the entire member stamped from a single piece of sheet metal. Legs 45 bowed at their inner edge extend downwardly from the body portion 42 and the offset portion 43.

In the stamping operation an ear 44 with notches 46 adjacent the body portion is cut out and formed at right angles to the support itself. The ear 44 pivotally carries the trigger 34 with one edge of an irregularly shaped aperture 47 in the trigger, resting in the notch 46 of the ear. The aperture 47 is substantially diamond-shaped. Specifically, however, the points 48, 49 and 50 lie on the arc of a circle described from point A with the radius of the circle, or the distance from A to 49 equal approximately to the width of the bridge between the notches 46 in the ear 44. The upper edge of the aperture from 48 to 50 is curved slightly for greater freedom on pivotal movement of the trigger. A notch 51 opening inwardly from the rear of the head 37 of the trigger, and below the rounded upper edge of the same, is adapted to hold the jaw 21 in set position. A shoulder 52 extending outwardly from the notch 51 cooperates in the jaw setting operation as will be hereinafter explained.

The support 41 is fastened in the base 15 by means of the legs 45 similar to the legs 18 of the staple 16. The member is driven into the wood in a punch press or the like, with the hammer engaging shoulders 53. The bow-shaped inner edge on a relatively thin leg 45 causes each leg to be directed outwardly and bend to the position shown in Fig. 2. This has been found to provide a very rigid anchoring means to hold the support against upward movement, and with the legs spread out as indicated, the member is reenforced against sideward bending. To provide additional rigidity, a downwardly depending pointed flange 54 is also driven into the wood upon the driving operation.

In assembling the trap, the bearing staples 16 and the lever support 41 are first driven into the wood. The trigger lever 36 is raised to almost a vertical position to slip the aperture 47 over the ear 44 and then dropped down to the position shown in Fig. 2. The treadle, jaw and spring assembly is completed by mounting the springs 22 and 23, and the treadle 34, on the pin 19, and then inserting said pin in the bearing apertures 17 of the members 16, with the treadle lying over the shank of the trigger.

The trap may then be set by pressing the jaw 21 backwardly against spring tension from the position illustrated in Fig. 1 to the final set position shown in Fig. 4. Intermediate the latter position the jaw slips over the rounded upper edge on the head 37 of the trigger, and engages the shoulder 52, as shown in Fig. 3. In this operation the trigger is pivoted at 46 to raise the front end of the same. As this portion strikes the under surface of the seat 33 it is guided by the inclined wall either to slit 31 or 32 through which it passes to fall back onto the top of said seat. In this position the trigger rests on the seat along the curved edge 38, and the jaw 21 bears against the upper edge of the notch 51 to be retained therein under the tension of the spring coils 22 and 23. The length of each of the slits is such as to accommodate the trigger 34 as it is tipped up, so that the trigger does not engage the treadle and tip it in order to move the trigger into set position on the seat 33.

When the trap is set, the lowermost point A of the aperture 47 bears against the top of the lower notch 46. The irregular, somewhat diamond-shape of the aperture 47 assists in centering the trigger lever when in this operative position.

To spring the trap, the bait-holding portion 26 is pushed down to pivot the treadle on the pin 19. As the treadle is pivoted the lowermost edge of the seat 33 describes a circle with the pin 19 as the axis. The curved edge 38 slides on the edge of the seat and when the treadle reaches the position where this portion will slide off the seat, the trigger 34 drops to release the jaw retained in the notch 51.

Inasmuch as the only function of the depressed seat 33 with inclined side walls is to guide the front end of the trigger 34 into either one of the two slits 31 or 32, and then after the trigger has passed therethrough to form a slide to move it into the seat as it falls back to the position of Fig. 4, I eliminate this structure in the modification of Fig. 6. The treadle 61 illustrated in the figure is identical with that of Fig. 5 except that the body portion 62 is flat across the top, with the top surface at a height corresponding to the distance from the bottom of the treadle to the lowermost point of the seat 33 in Fig. 5. In other words, the rounded top of the body portion 27 is eliminated.

Similarly, the bridge 63 is flat on its top surface. Flattening the surfaces of the body 62 and bridge 63 results in a considerable saving in material. This is important when considering the very large quantities in which a device of this character is manufactured. When using this treadle, the jaw setting operation is identical with that previously described except that the treadle is tipped slightly as the trigger lever is brought up under the same, to permit said trigger to pass the edge 64, and fall back on top of the body portion 62.

A modification of the trigger support of Fig. 8 is illustrated in Fig. 9. The modified structure comprises a flat body portion 91, with an ear 92 extending at right angles therefrom and an intermediate slot 93 to carry the trigger lever in the manner previously described. Shoulders 94 are provided for engagement to drive the legs 96, bow-shaped on their inner edges, into the wooden trap base. The legs are notched slightly at 97 adjacent their top to increase the spread of the legs as they are driven into the wood. A depending flange 98 underneath the body portion may be driven into the wood to increase the rigidity of the support.

Figs. 10 and 11 illustrate respectively a modified trigger lever and a modified support. The trigger lever 101 is identical with lever 34 except that in the modified embodiment an ear 102 extends at right angles to the head 103 of the lever, being similar to the ear 44 on the support 41.

In Fig. 10 the ear 102 as illustrated extends rearwardly from the head. Notches 104 are provided intermediate the head and ear similar to notches 46. A generally diamond-shaped aperture 111 is provided in the modified support 112 illustrated in Fig. 11, and corresponds to the aperture 47 in the lever 34. The support 112 includes an offset portion 113 and has downwardly depending legs 114 similar to the support of Fig.

8. Notches 116 on the legs cooperate to give greater spread to the legs. It is of course understood that similar notches may be provided in the support of Fig. 8. And further, that the embodiments of the invention illustrated in both Figs. 8 and 11 may be provided in a flat body portion as shown in Fig. 9.

In the modification of Figs. 10 and 11, therefore, the ear 102 of the lever is inserted in the aperture 111 of the support. The lever pivots with the notches 104 in the ear resting on either the upper or the lower edge of the aperture 111 depending on the condition of the trap, as previously explained.

Figs. 13 and 14 illustrate a modification of the bait holding member in which a wooden block 131 is secured to the bait holding portion of the treadle 24 by a pair of prongs 132 onto which the block is driven. A cavity 133 is provided in the center of the block to hold the bait. If the purchaser desires a wood bait holding portion on a trap, the trap previously described may be supplied at very little additional cost with a block 131.

It will thus be seen that I provide a simple, inexpensive mouse trap with the trap operating mechanism sturdy, yet stamped from a minimum of sheet metal material at very low cost. The trap, when assembled, has been found to be exceptionally sturdy, and affording little play in the treadle and trigger members. Although the trap is quickly and easily set and then retained in set position so as to prevent any possibility of it springing out of locking engagement during the handling of the same, it still remains very sensitive so that the treadle will move on very slight pressure.

Although I have described my invention in its preferred embodiments, it is understood that I do not wish to be limited thereby, but limit the invention only by the scope of the appended claims.

I claim:

1. In an animal trap comprising a base, and a spring actuated jaw pivoted thereon, the combination of a trigger cooperating to lock said jaw in operative position, and comprising an elongated body portion and an apertured enlarged head, and a support carried on said base having means on one side thereof extending into and removable in its normal condition from the aperture in said trigger for pivotally carrying the same.

2. In an animal trap comprising a base, and a spring actuated jaw pivoted thereon, the combination of an elongated trigger member cooperating to lock said jaw in operative position, a support plate member rigidly secured to said base in a vertical position, one of said two members having an aperture therein, and a notched ear on one side of the other said member extending through said aperture for pivotal engagement of the two, whereby to pivot the trigger member to lock the jaw.

3. In an animal trap comprising a base, a spring actuated jaw, and an axle supported on the base for carrying said jaw, the combination of a bait treadle pivoted on the jaw axle comprising a U-shaped body portion having an elongated slot along the top thereof, and an elongated trigger lever pivotally carried on the base and laying beneath said treadle in inoperative position, said treadle having a pair of slits opening out of the front of the slot and extending into the body portion of the treadle, and inclined guide means intermediate the slits, whereby upon setting said trap in operative position said trigger lever is tipped upwardly through one of two slits to fall back and rest upon the top of said treadle cooperating to lock the jaw in operative position.

4. In an animal trap comprising a base, a spring actuated jaw, an axle pin supported on the base for carrying the jaw, the combination of a bait treadle pivoted on the pin including a substantially U-shaped body portion having an elongated slot on the top thereof, and a trigger lever pivoted at the rear of the base and lying beneath the treadle when in inoperative position, with said lever having an elongated shank extending to an irregularly shaped point at the front end thereof having an inwardly curved lower edge at said front end adapted to rest on the top of the treadle at the front of the slot when said trap is in operative position.

5. In an animal trap comprising a base, a spring actuated jaw pivoted thereon, the combination of a pivotally supported bait treadle, and a trigger lever comprising an elongated body portion having an enlarged head at one end and an irregularly shaped point at the other end with said point having an inwardly curved lower edge corresponding to the arc of a circle, and means for pivotally supporting said lever at the enlarged head portion whereby said lever is tipped in the setting operation of the trap with the front end above the treadle and bearing on the top surface thereof at said lower curved edge in a position to slide off said treadle as the latter is pivoted to spring the trap.

6. In an animal trap comprising a base, and a spring actuated jaw pivoted thereon, the combination of an elongated trigger member cooperating to lock said jaw in operative position, and a support plate member rigidly secured to said base in a vertical position, one of said two members having an elongated aperture therein, and a notched ear on one side of the other said member extending through said aperture for pivotal engagement of the two, whereby to pivot the trigger member to lock the jaw, said ear being of a size to pass through said aperture when positioned lengthwise thereof but being too large to pass therethrough otherwise, and being normally positioned transversely thereof.

7. In an animal trap comprising a base, and a spring actuated jaw pivoted thereon; means cooperating to lock said jaw in operative position, including the combination of a rigidly mounted support member extending upwardly from said base, and a pivotal member pivotally secured thereto by means of an ear extending laterally from one of said members through an elongated aperture in the other said member, said ear being enlarged at its end to form oppositely disposed notches thereon at its base engaging the walls of the aperture in the said other member to secure said members together when said pivotal member is in its normal position, said ear being small enough to pass through said aperture when said pivotal member is turned to a different position.

8. In an animal trap comprising a base, and a spring actuated jaw pivoted thereon; means cooperating to lock said jaw in operative position, including the combination of a rigidly mounted support member extending upwardly from said base, and a pivotal member pivotally secured thereto by means of an ear formed on one member and extending through an aperture in the other member and further extending parallel to said members to engage the far side of said other member to secure the said members together, said aperture being sufficiently large to permit ready assembly of said members by insertion of said ear therethrough.

9. In an animal trap comprising a base, and a spring actuated jaw pivoted thereon, means cooperating to lock said jaw in operative position, including the combination of a rigidly mounted support member extending upwardly from said base, and a pivotal member pivotally secured thereto by means of an ear formed on the said support member and extending through an aperture in said pivotal member and upwardly on the far side thereof to retain the two members together, said aperture being sufficiently large to permit ready assembly of said members by inserting said ear through said aperture.

10. In an animal trap comprising a base, a spring actuated jaw pivoted thereon, and a trigger cooperating to lock said jaw in operative position; a support plate having means for pivotally carrying said trigger, said plate including a flat-sided body portion having a pair of pointed legs extending downwardly therefrom for insertion in the base of the trap, with said points being under the bodies of the legs to prevent premature bending thereof, and with each of said legs curved along the inside edge over the length thereof, whereby to spread outwardly upon being driven into the base to secure the support thereto.

11. In an animal trap comprising a base, a spring actuated jaw pivoted thereon, and a trigger cooperating to lock said jaw in operative position; a support plate having means for pivotally carrying one of said members, said plate including a body portion having a pair of pointed legs extending downwardly therefrom for insertion in the base of the trap, with each of said legs having vertical outside edges to prevent premature bending of the legs and being curved along the inside edge over the length thereof, whereby to spread outwardly upon being driven into the base to secure the support thereto.

12. In an animal trap comprising a base, a spring actuated jaw pivoted thereon, and jaw locking mechanism having a portion thereof engaging the jaw to lock the same in operative position; means for pivotally supporting said jaw including a flat bearing staple at each side of the base comprising an apertured body portion and a pair of legs extending downwardly therefrom, and a pin carrying said jaw and fitting smoothly in said aperture.

HERBERT A. STILSON.